United States Patent [19]

Caro et al.

[11] Patent Number: 4,787,982
[45] Date of Patent: Nov. 29, 1988

[54] MEMBRANE SEPARATION APPARATUS AND METHOD

[76] Inventors: Ricardo F. Caro, 1515 NW. 13th St., Corvallis, Oreg. 97330; Robert J. Salter, 30636 Peterson Rd., Corvallis, Oreg. 97333

[21] Appl. No.: 939,699

[22] Filed: Dec. 9, 1986

[51] Int. Cl.$^4$ .............................................. B01D 13/00
[52] U.S. Cl. .................................. 210/641; 210/644; 210/321.64; 210/321.67; 210/321.78
[58] Field of Search ............... 210/636, 409, 651, 336, 210/321.1, 433.2, 641, 644, 321.64, 321.67, 321.78; 204/296, 301

[56] References Cited

U.S. PATENT DOCUMENTS

| | | | |
|---|---|---|---|
| 2,864,506 | 12/1958 | Hiskey | 210/651 X |
| 3,212,498 | 10/1965 | McKirdy et al. | 210/646 X |
| 3,727,612 | 4/1973 | Sayers et al. | 210/641 X |
| 3,962,075 | 6/1976 | Fialkoff et al. | 210/641 |
| 3,969,241 | 7/1976 | Skrabak et al. | 210/336 X |

OTHER PUBLICATIONS

WO82/03568, Pursun et al., 10-1982.

Primary Examiner—Frank Spear
Attorney, Agent, or Firm—Paul M. Klein, Jr.

[57] ABSTRACT

Continuous flow membrane separation is accomplished by apparatus adaptable for osmosis, dialysis, and electrodialysis. For electrodialysis to separate from one another, in a single step, multiple differing molecular weight components of fluids, a series of adjoining flow chambers are all separated from one another by semipermeable membranes and at least one of the chambers is separated from each adjoining chamber by a membrane having a molecular weight cutoff different from that of the membrane separating it from the other chamber adjoining it. To insure that neither the crude to be processed nor the desired product comes into contact with an electrode which could be deleterious, there is provided a minimum of four flow chambers adjoining one another in sequence.

Adapted for all three separation processes is an assembly of a tubular membrane encircled by a flexible reinforcing mesh fabric with pressure in the fluid within the membrane sufficient to bulge the membrane radially and outward into the interstices of the mesh fabric to eliminate dead spots in fluid flow along the exterior of the membrane and sufficient to stiffen and straighten the membrane tube into essentially the form of a right cylinder. For electrodialysis, one or more additional, similar, successively larger reinforced membrane assemblies, surround(s) the first assembly. A housing encloses the membrane(s) to form a cartridge. The membranes are spaced to avoid contact with electrodes used in electrodialysis.

10 Claims, 2 Drawing Sheets

U.S. Patent  Nov. 29, 1988  Sheet 1 of 2  4,787,982
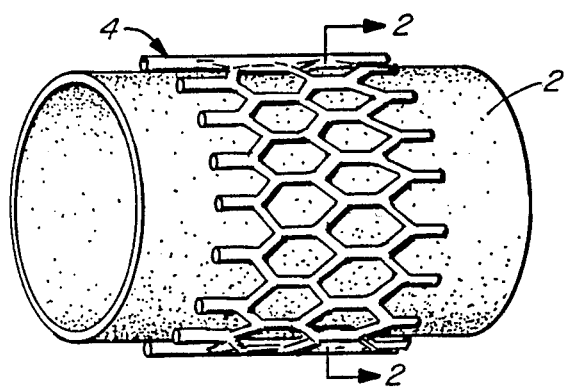
FIG._1
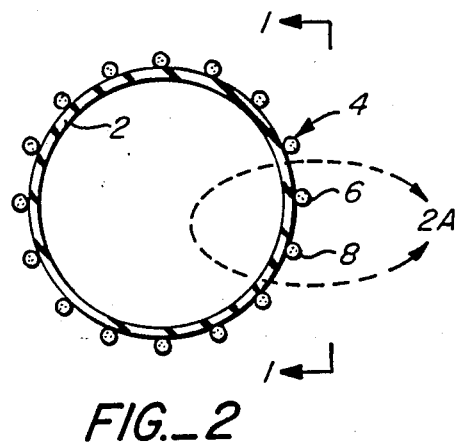
FIG._2
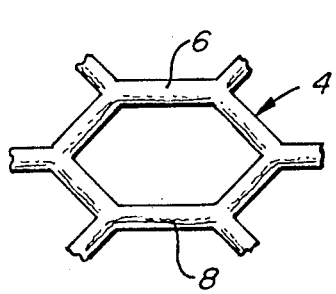
FIG._4
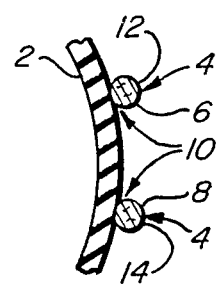
FIG._2A
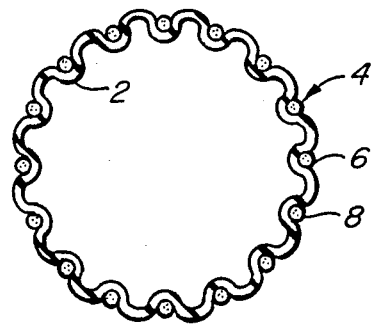
FIG._3
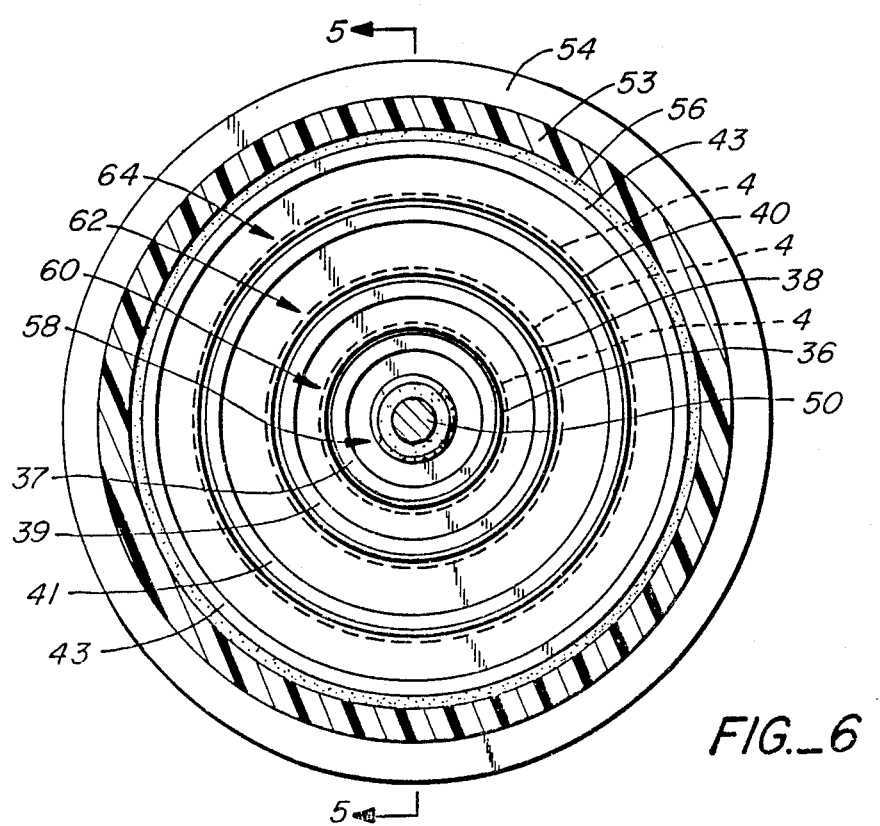
FIG._6

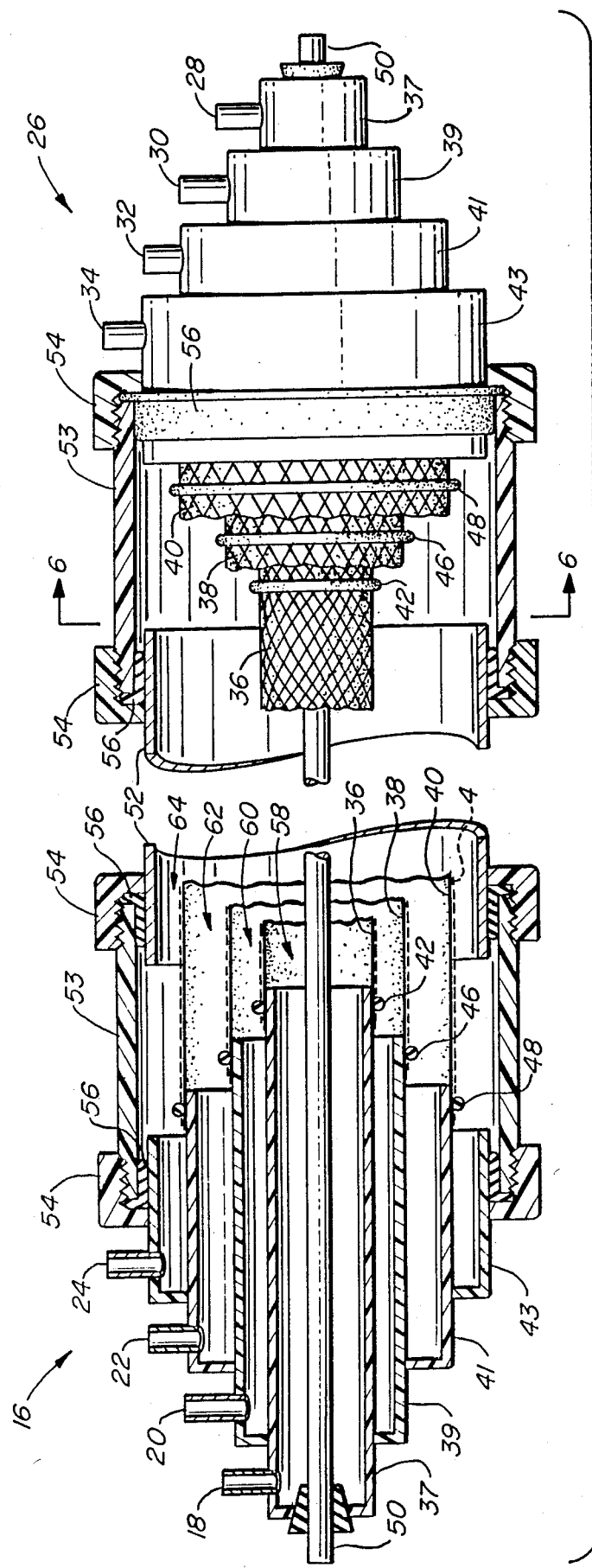
FIG._5

MEMBRANE SEPARATION APPARATUS AND METHOD

BACKGROUND OF THE INVENTION

1. Field of the Invention

This invention relates to continuous flow membrane separation apparatus for use in osmosis, dialysis and electrodialysis and to a method of operating such apparatus. In particular, this invention relates to (1) a special assembly usable in such apparatus and comprising a tubular membrane and its associated reinforcing means and (2) an arrangement in which at least one flow channel chamber of the apparatus is separated from each of two adjoining flow channel chambers by, respectively, one of two separate membrane barriers having different molecular weight cutoff values and (3) an electrodialysis apparatus having at least four separate flow channel chambers.

2. Prior Art

Membrane separation is a process by which one or more components carried by a crude or feed fluid which is in contact with one side of a semipermeable membrane are separated from other components in the crude when a wash or rinse fluid is in contact with the other side of that membrane. Examples of membrane separation are direct osmosis, usually called simply osmosis, dialysis and electrodialysis.

In continuous flow membrane separation there has existed the problem of reinforcing the membrane, whether it be of the tubular type or the flat sheet type used in plate and frame apparatus. To maximize the permeate flux through the membrane, such membrane is usually made as thin as possible. To reinforce such a thin membrane against rupture under the pressure involved in producing the continuous flow, a reinforcing means in contact with the membrane is needed which perforce covers a relatively large portion of area of the membrane if the transmembrane fluid pressure difference is relatively large. The presence of such a reinforcing means thus significantly reduces the effective bare area of the membrane in contact with fluid on the low pressure side of the membrane, hence undesirably reducing the portion of the membrane from which permeate can flow unobstructedly away from the membrane and rinse fluid can flow unobstructedly against the membrane. Additionally, such a reinforcing means typically provides "dead" spots where fluid flow rate is reduced causing concentration polarization. Both of these phenomena thus reduce the effective flux through the membrane.

Typical prior art electrodialysis apparatus has three chambers, the chamber through which the crude or feed fluid flows being separated by membranes from each of the outer two chambers, each of which latter contains an electrode. In such an arrangement there is unavoidable contact between an electrode and the fluids, which may contain desired products, flowing in the chambers adjoining the single intermediate chamber containing crude. Such contact of electrodes with desired products is undesirable since it may well alter such products detrimentally. Also the products may detrimentally affect the electrodes by causing deposits thereon or the like.

By way of example, pertinent prior art is shown in U.S. Pat. No. 2,739,938 issued to S. G. Wiechers illustrating a three-chamber electrodialysis apparatus and in an article by Jan Al and S. G. Wiechers entitled "Production of an Artificial Human Milk", in the January 1952 issue of the journal "Research" subtitled "Science and its Application in Industry", published by Butterworths Scientific Publications, London, England. The article shows and describes the equipment of which the apparatus of the patent forms a part.

The apparatus of the patent comprises an inner, vertically oriented cylindrical electrode, an outer cylindrical electrode concentric with the inner electrode, and two tubular semipermeable membranes spaced from each other and interposed concentrically between the electrodes from which they are also spaced. This arrangement thus forms three concentric chambers, each annular in cross-section, through each of which liquid can flow in the vertical direction. The outer chamber is bounded by the cylindrical outer electrode and the outer cylindrical tubular membrane, the inner chamber is bounded by the cylindrical inner electrode and the cylindrical inner tubular membrane, and the intermediate chamber is bounded by the two tubular membranes. The patent teaches the use of flexible reinforcing means applied circumferentially around one or both membranes such as will give such an effective resistance to the stresses exerted on the membrane that the deformation of the membrane in the radial direction will remain negligible. In other words, the spacing between the strands of the reinforcing means is kept sufficiently close for such purpose. The patent notes that the liquid filling up the interstices between the strands or threads of the reinforcing means arranged close together will have a much lower velocity than in those regions through which the liquid can flow without impediment and that this slowing down is undesirable.

From the Al and Wiechers article it is clear that suspended solids, exemplified by flocculation of proteins (commonly present in liquids to be desalted by electrodialysis) tend to clog or foul the membranes.

SUMMARY OF THE INVENTION

This invention comprises an assembly usable in apparatus for osmosis, dialysis, and electrodialysis, comprising a thin flexible tubular semipermeable membrane which, when not inflated, is flaccid and flat, and reinforcing means, made of supple, soft material and provided with interstices, encircling the membrane tube to restrain the membrane tube against rupture when the tube is inflated by internal fluid pressure sufficient to bulge the membrane generally radially outward into the interstices of the material of the reinforcing means to a distance equal to at least the radial thickness (hereinafter defined) of the elements of the reinforcing material forming the boundaries of the interstices and which pressure is also sufficient to straighten the membrane tube essentially into the form of a right cylinder and to stiffen it.

By "radial thickness" of an element bounding an interstice of the reinforcing material is meant the distance measured on a prolonged radius of the cylindrical membrane between the point of intersection of that radius with the bounding element where the element contacts the exterior surface of the membrane cylinder and the point of intersection of that prolonged radius with an imaginary circle concentric with the membrane cylinder and passing through the radially outermost point of that bounding element.

The invention also includes the method of membrane separation using the aforedescribed apparatus having a tubular semipermeable membrane and its associated reinforcing means which method includes the step of subjecting fluid located in the membrane tube for participating in the separation process to sufficient fluid pressure to bulge the membrane generally radially outward into the interstices of the reinforcing means to a distance equal to at least the radial thickness of the elements of the material of the reinforcing means forming the boundaries of the interstices and also sufficient to straighten the membrane tube and stiffen it. If the nominal diameter of the membrane tube exceeds the inside diameter of the reinforcing means bulging of the membrane to the minimum required level will be achieved at a lower pressure than if the nominal diameter of the membrane tube is less than the inside diameter of the reinforcing means. This bulging effect takes out slack membrane material which in turn causes stiffening and straightening of the tube.

This invention further includes the aforedescribed assembly in the condition wherein the membrane tube is in its inflated, straightened, stiffened state and bulging radially into the interstices of the material of the reinforcing means to the prescribed distance. Bulging of the membrane to the prescribed distance contributes to maximizing flux by serving to eliminate depressions or cavities that would otherwise be formed by the elements bounding the interstices and the portions of the membrane spanning the interstices of the reinforcing material. Such depressions or cavities would tend to produce "dead" spots or pools where flowing fluid contacting the exterior surface of the membrane exposed in the interstices would tend to slow down and stagnate, thus undesirably reducing the flux of permeate because of concentration polarization. The "dead" spots may cause a rise in the concentration of chemical substances that may be damaging to the membrane.

The straightening and stiffening of the membrane are made sufficient to keep the components of the membrane and reinforcing means assembly out of contact with adjacent structural components present in apparatus of which the assembly forms a part. This avoids possible damage or puncture of the membrane by sharp points or edges that may exist on adjacent components. Further, it serves, as explained immediately hereinafter, to maximize the flux of permeate. As a structural component in each apparatus there is typically found, circumjacent the assembly and with its central longitudinal axis extending in a straight line, another similar assembly or a housing or shell. If the original assembly is not maintained in a straightened, stiffened condition it will obviously sag, if oriented generally horizontally. It will billow or deflect to the side, if oriented generally vertically. Thus, in any case it will tend to touch any nearby structural component. The exterior of the original assembly forms together with the circumjacent structural component the boundaries of a fluid flow channel conducting fluid to bathe the exterior of the membrane tube of the original assembly to accomplish the membrane separation process. Were the original assembly to touch the circumjacent component the flow of the bathing fluid would be impeded at the area of contact with consequent undesirable concentration polarization causing unwanted reduction of flux of permeate. Additionally, at the area of contact there would be the also undesirable actual mechanical blocking or impeding of that permeate which does not succeed in penetrating through the membrane.

Similar undesirable results attendant upon impeded fluid flow would occur if the membrane tube of the original assembly were to sag or deflect so as to touch a structural component, such as a longitudinally extending rod or rigid cylinder or another membrane-plus-reinforcement assembly located within the membrane tube of the original assembly. In addition to the impediment to flow caused by contact of the original assembly with an enclosed rod or cylinder or with a circumjacent shell, or the like, undesirable damage to the membrane tube could be produced when the rod, cylinder, or shell happens also to be an electrode used in electrodialysis.

The invention additionally comprehends the configuration of the material of the reinforcing means for the membrane tube to maximize that portion of the exterior surface of the membrane tube which is left uncovered and thus bare and open to view in the interstices of the reinforcing material. Typically, under the concept of the invention, a portion in excess of 60% of the membrane area is left bare. This contributes to maximizing the flux of permeate through the membrane by maximizing the area of the membrane surface capable of direct, unobstructed contact with the fluid stream bathing the exterior surface of the membrane.

Further, the invention includes the separation from one another of components of different molecular weights carried by fluids by means of apparatus comprising a series of sequentially adjoining chambers, through each of which fluid can flow. Each chamber is separated from each chamber that adjoins it by a semipermeable membrane forming a barrier common to the two adjoining chambers. At least one chamber of the series is separated from a first chamber that adjoins it by a first membrane barrier having a certain molecular weight cutoff and is separated from a second chamber that adjoins it by a second membrane barrier having a molecular weight cutoff different from that of the first membrane barrier.

The invention, in addition, includes electrodialysis apparatus having a group of four or more chambers through which fluids can flow wherein each chamber is separated from each other chamber that adjoins it by a semipermeable membrane forming a barrier common to the two adjoining chambers which is capable of being bathed on each of its two surfaces, respectively by fluid present in each of the two adjoining chambers and wherein the two adjacent membranes bounding at least one of the chambers have different molecular weight cutoff values from one another. Also the fluid inlet and outlet means for each chamber are separate from those for every other chamber so that fluid for each chamber can enter and leave that chamber without flowing in the same conduit or manifold in which the fluid of another chamber is simultaneously flowing. This arrangement provides for the electrodes to be in contact with fluids in the two terminal members of the group of chambers so that the feed or crude stream and the product stream, which typically flows through a chamber separate from that of the crude stream, are both flowing in chambers intermediate in the group and hence are not in contact with the electrodes that might have a harmful effect on the crude or on the product.

This invention also provides for simultaneous separation in a single operation from the crude and from each other of at least three components originally in the crude stream, each of which may be separately useful.

This arrangement also allows for control of the pH and concentration of dissolved suspended solids in the fluids flowing through the chambers containing the electrodes and in contact with the electrodes. This is accomplished by replenishing such fluids with clean rinsing fluids continuously to keep the concentrations in the electrode chambers at the desired levels.

Other advantageous features of this invention will become apparent from the following detailed description taken in conjunction with the accompanying drawings.

BRIEF DESCRIPTION OF THE DRAWINGS

FIG. 1 is a schematic axonometric view of the assembly of this invention comprised of a tubular semipermeable membrane with a hexagonal-mesh netting constituting one preferred reinforcing means for the membrane;

FIG. 2 is a cross-section of the assembly of FIG. 1 taken along the line 2—2 in FIG. 1 when the membrane tube is filled with liquid under low pressure, showing only the parallel mesh boundaries that appear in cross section and omitting, for clarity, the converging boundaries that would appear in elevation;

FIG. 2A is an enlarged fragment taken along line 2A in FIG. 2;

FIG. 3 is a cross-section of the assembly of FIG. 1 taken along the line 2—2 in FIG. 1 when the membrane tube is filled with liquid under pressure sufficiently greater than in FIG. 2 to bulge it into the interstices of the reinforcing material;

FIG. 4 is an enlarged schematic plan view of a fragment of the netting material of FIG. 1;

FIG. 5 is longitudinal view, partly in cross section and partly broken away, of a four-chamber tubular electrodialysis apparatus of the invention; and FIG. 6 is an enlarged cross-section taken on the line 6—6 in FIG. 5, omitting for clarity some structures, such as O-rings, and some cross-hatching.

DETAILED DESCRIPTION

The invention involves tubular semipermeable membranes usable in a manner well knonw in the art for osmosis, dialysis, and electrodialysis. When any such membrane is used in an apparatus to carry out such membrane separation processes in a continuous manner, a fluid flows through the interior of the membrane tube and simultaneously another fluid flows along the exterior surface of the membrane tube. If the hydrodynamic pressure in the fluid inside the membrane exceeds that on the exterior of the membrane there is a net radially outward pressure tending to rupture the membrane. The invention includes reinforcing means, made of supple, soft material and provided with interstices, encircling the membrane tube to restrain the membrane against rupture when the membrane tube is inflated by internal fluid pressure sufficient to produce a net radially outward difference of hydrodynamic pressure across the membrane that will cause it to bulge substantially into the interstices of the reinforcing material and that will cause it to straighten and stiffen generally into the form of a right cylinder.

The material chosen for the reinforcing means must be strong enough to resist the stresses it will encounter and also must be inert to the fluids and other products it will encounter. It may be in the form of essentially any type of fabric: woven (included braided) knitted, pressed, molded, or created from originally imperforate plastic sheeting or the like by making holes in it to thereupon constitute patent interstices, or by slitting it and thereafter stretching it to form patent interstices in the manner used for form expanded plastic sheets of the product know variously as vented plastic wrap, lettuce wrap, or serrated wrap. The fabric can either be originally fabricated in tublar form or, if the fabricated as a sheet, can be sewn or otherwise joined together to form a tube to surround the membrane tube. Netting or mesh fabrics have been found to be especially useful. One satisfactory example is what is known in the trade as cubicle netting style 22/1000 made by Frankel Associates of New York, N.Y. It is made of 210 denier nylon, warp knitted by the Raschel knitting process.

In FIG. 1 there is shown, schematically, a tubular membrane 2 surrounded by a netting 4 constituting one preferred embodiment of the reinforcing means. This netting is an open mesh textile known as style L5 made by Apex Mills Corporation of Lynbrook, N.Y. It is made of polyester, Raschel knit with 19 meshes per square inch and weights about 1.269 ounces per square yard. It is about 0.016 inches thick, has a tensile warp strength of 36.84 lbs., a tensile fill strength of 18.30 lbs. and a ball burst strength of 39.78 lbs.

When the assembly of membrane tube and netting is used in membrane separation apparatus the tube 2 is fastened at its ends, as by means such as are well known in the prior art, to pipe stubs or the like, not shown, serving as an inlet and outlet for fluid to flow through the tube. Since the tube is thin and delicate it is prudent to provide, for example, a soft sleeve of rubber or similar elastomer over the pipe stub end. The end of the membrane assembly tube is drawn over the soft sleeve, a similar sleeve is then drawn over the outside of the assembly encircling the pipe stub and clamping means is then applied to clamp the assembly in fluid-tight connection to the pipe stub.

When the membrane tube 2 is not inflated it is flaccid and lies flat as it comes from the manufacturer. When the uninflated assembly is mounted on pipe stubs the cross-section of the membrane tube appears approximately as a flat collapsed oval. With the outside diameter of the membrane tube slightly smaller than the inside diameter of the netting, then when filled with liquid under a pressure of about one psig, the cross-section appears generally circular as seen in FIG. 2 and the membrane, typically made of regenerated cellulose from 1 to 3 mils thick, has not noticeably deformed outwardly in the radial direction. Under such a liquid load, with the hydraulic pressure of approximately 5 psig, a six foot length of membrane assembly using 1 inch diameter tubular membrane and oriented horizontally will not remain straight, as shown in FIG. 1, but will sag and exhibit about a 4 inch deflection from the horizontal at its midpoint.

According to the method of this invention the fluid in the tube is subjected to sufficient pressure to bulge the membrane radially outward substantially into the interstices of the reinforcing material and to straighten and stiffen the membrane tube so that it becomes generally a right cylinder. When the fluid pressure in the illustrated embodiment reaches about 7 psig the required bulging occurs, as seen in FIG. 3 and the assembly appears straight i.e., essentially without sag.

In its flaccid, unstressed condition, as shown in FIG. 4, the preferred netting of this embodiment exhibits mesh openings in the shape of a symmetrical hexagon with two parallel sides 6 and 8 about ¼ inch long and four others each about ⅛ inch long, those aforementioned parallel sides being spaced apart about 3/16 inch.

The average width of the knitted strands constituting the elements bounding the mesh opening, namely the sides of the hexagon, is about 3/64 inch. This netting leaves about 70% of the membrane bare.

When the membrane tube is subjected to an internal hydraulic pressure insufficient to bulge the membrane 2 substantially into the interstices, i.e, the mesh openings of the netting, then undesirable "dead" spots such as 10 in FIG. 2A are created in depressions or cavities such as that shown in FIG. 2 where the floor of the cavity is constituted by that portion of the membrane 2 which spans the six sides of the hexagon, of which only the two sides labelled 6 and 8 are shown for clarity. The walls of the cavity are constituted by those six sides of the hexagon. In such a cavity fluid contacting the exterior of membrane 2 tends to form a pool in which the flow tends to stagnate or slow down. This makes for concentration polarization which undesirably reduces the permeate flux.

According to the invention the membrane 2 is to be subjected to sufficient internal pressure to bulge it into the interstices to a distance equal to at least the radial thickness of the elements bounding the interstices. In FIG. 2A, this would mean that the membrane would have to bulge into the interstices up to at least the level of the surfaces 12 and 14 of the sides 6 and 8 of the hexagon (as well as the corresponding surfaces of all the remaining sides of the hexagon, including those omitted from the drawing for clarity). In this instance the radial thickness of the bounding elements is the same as the thickness of the netting material, i.e. about 0.016 inches. If the reinforcing material were of the expanded plastic sheet type, similar to lettuce wrap, then the radial thickness of the bounding elements would not be defined as the thickness of the plastic sheet but rather would be the width of the strips of the slit plastic standing on edge to form the interstices.

In FIG. 3 the membrane 2 is shown bulged into the interstices to a distance greater than the radial thickness of the bounding elements, such as 6 and 8. In practice, this can commonly occur and there will be no rupture of the membrane as long as the allowable tensile stress of the membrane material is not exceeded. When the membrane is inflated, the reinforcing fabric is stressed so that the hexagonal mesh openings convert to essentially circular openings. Assuming for the simplicity of calculations that the interstices are circular, then it can be shown that, for a membrane of given thickness subjected to a given hydrodynamic pressure differential across the membrane, the stress induced in the membrane is proportional to the diameter of interstices. Thus if a hydrodynamic pressure is chosen to be applied to the fluid in the membrane tube to achieve a desired flow rate through the tube and a pressure is chosen to be applied to the fluid contacting the exterior surface of the tube (which latter fluid is always present in membrane separation apparatus), then the maximum allowable diameter for the interstices can be calculated, knowing the thickness of the membrane and the maximum allowable tensile stress in the membrane. According to the invention, by configuring the reinforcing means to provie what amounts to large diameter interstices commensurate with allowable stress in the membrane fabric, there is achieved a highly favorable ratio of bare membrane surface to total membrane surface. If the maximum allowable diameter for each single interstice is used then the maximum total area of the membrane is left uncovered by the entire reinforcing material. With membranes of the order of 1 to 3 mils thick the aforedescribed mesh fabric shown in FIG. 4 leaves in excess of 60% of the membrane bare, exposed to view in the interstices, with no risk of rupture at fluid pressures of about 28 psig. Using similar fabrics according to the teaching of this invention bare areas of 90% have been achieved.

Commonly the bulges of the membrane which enter into the interstices are formed by the hydrodynamic pressure of the fluid in the membrane tube. However, the invention includes the concept of membranes with preformed deformations, such as exist in one of the two bonded sheets of plastic constituting a piece of "bubble wrap". Such deformations can enter the interstices and, when inflated sufficiently by the fluid pressure differential to reach the prescribed radially outward distance, will constitute the bulges required by the inventive concept by serving to eliminate dead spots and pools aforementioned.

In FIGS. 5 and 6 there is shown a membrane separation apparatus embodying the inventive assembly of FIG. 1. This apparatus is a four-chamber electrodialysis unit with its longitudinal axis preferably oriented in a generally horizontal direction. To avoid a multiplicity of figures in the drawings the illustration in FIGS. 5 and 6 will also be used by simply envisioning the omission of certain structural elements, to describe apparatus using the inventive assembly for osmosis and for dialysis.

As seen in FIG. 5, there is a head unit generally indicated at 16, having four separate passageways for fluids with separate nipples, or the like, 18, 20, 22, 24 for leading fluids into or out of each passageway. A similar head unit, generally indicated at 26, is at the opposite end of the apparatus and has nipples, or the like, 28, 30, 32, 34 for leading fluids separately into or out of each of four separate passageways in that unit. A reinforced membrane tube assembly 36, in some preferred embodiments from 3 to 6 feet or more in length, similar to the assembly of FIG. 1, is slipped over the end of and attached in fluid-tight relation to pipe stub 37 or the like on head unit 16. A group of additional assemblies, in this example only two, namely, 38 and 40, similar to the assembly of FIG. 1, are also attached, respectively, to pipe stubs 39 and 41 or the like on head unit 16. Thus the three aforementioned assemblies are connected to, respectively, the innermost passageway, the next outer passageway, and the still further out passageway in head 16. The outermost passageway terminates within pipe stub 43 or the like. Similar connections are made between the assemblies and the head unit 26. Through the center of the apparatus extends a rod 50, serving as an electrode, in fluid-tight relation with the innermost passageway of each head unit.

A piece of pipe 52, or the like, fastened by any conventional means to the head units 16 and 26, forms a fluid-tight housing or shell around the several membrane assemblies. The illustrated fastening means includes nipples 53, threaded collars 54, and rubber gaskets or the like 56 constituting compression fittings to establish fluid-tight connections between pipe 52 and heads 16 and 26. Pipe 52 is typically many lengths longer than nipples 53 and is appreciably shorter than the distance between head 16 and head 26 in the final assembled configuration. With nipples 53 and intermediate collars 54 slid toward the midpoint of the length of pipe 52 and with pipe 52 centered between head 16 and 26 sufficient exposed gaps are provided between the ends of pipe 52 and heads 16 and 26 to give access to the ends of the membrane assemblies to fasten them to their respective pipe stubs on the heads. Pipe 52 may serve as an electrode.

Within the housing there is thus formed a series of four chambers 58, 60, 62, and 64, as seen in FIGS. 5 and 6. Chamber 58 is connected to nipples 18 and 28, chamber 60 to nipples 20 and 30, chamber 62 to nipples 22 and 32, and chamber 64 to nipples 24 and 34. The structural elements, rod 50, pipe 52, and the three membrane assemblies are shown as concentric but they need not necessarily be concentric.

Although it is efficient to employ rod 50 and pipe 52 as electrodes it would suffice, in principle, for electrodialysis to simply have the tip of a piece of wire as an electrode, dipping into fluid in chamber 58 and a similar wire tip dipping into the fluid in chamber 64.

To use this apparatus for electrodialysis, crude material is flowed through chamber 62. The crude may, for example, be a mixture of a desired protein contaminated with say calcium chloride, bacteria, and other components. The membrane of assembly 38 is chosen to have a molecular weight cutoff large enough, say 20,000, to allow permeation of the desired protein into product chamber 60, but not the undesired bacteria, etc., which are larger. The membrane of assembly 36, forming the other boundary of product chamber 60, is chosen to have a molecular weight cutoff small enough, say 3500, to retain the desired protein in chamber 60 but still large enough to permit calcium ions, for example, to permeate into chamber 58. Rinse fluids comprised of water with some electrolytes in solution are flowed through chambers 58 and 64. With pipe 52 connected as anode and rod 50 connected as cathode to a source of direct current and with the molecular weight cutoff, say 3500, of the membrane of assembly 40 chosen to allow permeation of chloride ions but retain in chamber 62 any larger solutes or suspened components destined in this case for disposal, then the desired positively charged protein will be pulled through membrane 38 into chamber 60 as the purified product to be flowed out through nipple 20.

The embodiment in its entirety shown in FIGS. 5 and 6 is thus seen to illustrate two of the aforementioned novel concepts of this invention:

(1) By having a series of adjoining chambers all separated from one another by membranes and in which at least one, in this case 60, is separated from each chamber which adjoins it by a membrane having a molecular weight cutoff different from that separating it from the other chamber adjoining it the invention provides a compact, simple, unitary apparatus to accomplish the separation from one another in a single step process of multiple components of fluids when these components have different molecular weights. This concept is applicable to plate and frame apparatus as well as to tubular apparatus.

(2) The inventive provision of a tubular membrane apparatus with a minimum of four chambers adjoining one another in sequence insures that neither the crude nor the desired product is in contact with an electrode which could be deleterious to ingredients in these fluids.

An osmosis apparatus is made by simply omitting from the construction in FIGS. 5 and 6 the rod 50 and membrane assemblies 38 and 40, for example. This leaves only two chambers 58 and 64 and it is assumed that the head unit passageway for the omitted chambers are blocked or omitted. Fruit juice to be concentrated can be flowed rapidly through chamber 58 and concentrated sugar solution through chamber 64, now bounded by membrane assembly 36 and pipe 52. By osmosis, water from the fruit juice permeates into the sugar solution. The membrane assembly of this invention allows for rapid turbulent flow, without excessive pressure drop, and a relatively long region of contact with the membrane without fouling or concentration polarization even with fluids containing 75% or more of dissolved solutes and 35% suspended matter.

Dialysis can be carried out in apparatus similar to that described for osmosis except that in place of a concentrated sugar solution an appropriate rinse fluid of water or dilute salt solution is used and the membrane chosen is one with the proper pore size to allow permeation of the salts or the like to be extracted from the crude.

Various other embodiments of the invention can be made within the scope of the teaching hereinbefore set forth.

What is claimed is:

1. In a membrane separation apparatus for use in osmosis, dialysis, and electrodialysis, an assembly comprising a tube of thin, flexible, semipermeable membrane and reinforcing means, made of supple, soft material and provided with interstices, encircling said membrane tube to restrain said membrane tube against rupture when said membrane tube is inflated by internal fluid pressure to establish a transmembrane pressure difference sufficient to bulge said membrane generally radially outward into the interstices of said reinforcing means to a distance equal to at least the radial thickness of the elements of said material bounding the interstices and to generally straighten said membrane tube essentially into the form of a right cylinder and to stiffen it, the size of said interstices being such that said membrane bulges to said aforementioned distance when the magnitude of said transmembrane pressure difference is substantially less than the minimum at which any significant ultrafiltration occurs with said membrane.

2. The combination of claim 1 wherein the internal diameter of the reinforcing means is less than the nominal outside diameter of the membrane tube.

3. The combination of claim 1 wherein the material of said reinforcing means is configured to leave uncovered, and thus bare and open to view in the interstices of said material, a portion constituting in excess of about 60% of the area of the exterior surface of that segment of the membrane tube which is to be subjected to contact with liquid flowing within said membrane tube.

4. The combination of claim 1 further including an inner electrode placed to contact fluid located within said membrane tube of said assembly when fluid is so located;
   a group of additional assemblies, generally similar to said originally mentioned assembly but each succeeding assembly of said group having an inner diameter greater than the outer diameter of the preceding assembly of said group;
   the first of said group encircling and spaced from said originally mentioned assembly and each succeeding assembly of said group encircling and spaced from the preceding assembly of said group when the membranes of all of said assemblies are inflated;
   a housing encircling the outermost of said group of assemblies, thereby to provide a series of at least four chambers in said apparatus, through each of which chambers fluid, when present, is confined by the surfaces of the structural components of said apparatus to flow longitudinally in a channel generally in the form of a cylinder;

an outer electrode placed to contact fluid located in the outermost of said chambers when fluid is located in said outermost chamber, each membrane of at least one pair of adjacent membranes of said assemblies having a molecular weight cutoff different from the molecular weight cutoff of the other membrane of that pair;

and fluid inlet and outlet means for each of said chambers separate from those for the other chambers so that fluid for each chamber can enter and leave that chamber without flowing in the same conduit in which the fluid of another chamber is simultaneously flowing.

5. The apparatus of claim 4 wherein said inner electrode is encircled by said originally mentioned assembly and, when the membrane tube of said originally mentioned assembly is inflated, is spaced from said membrane tube and extends generally in the direction of the longitudinal axis of said membrane tube essentially coextensive with the length of that segment of the membrane tube in contact with fluid when fluid is present in said tube.

6. In a membrane separation apparatus for use in osmosis, dialysis, and electrodialysis, an assembly comprising a tube of thin, flexible, semipermeable membrane and reinforcing means made of supple, soft material and provided with interstices, encircling said membrane tube to restrain said membrane tube against rupture, said membrane tube being expanded by internal fluid pressure to establish a transmembrane pressure difference sufficient to bulge said membrane generally radially outward into the interstices of said reinforcing means to a distance equal to at least the radial thickness of the elements of said material bounding the interstices, said membrane tube being generally fully inflated, straightened and stiffened by said pressure difference to assume essentially the form of a right cylinder, and the size of said interstices being such that said transmembrane pressure difference which produces the bulging of said membrane to said distance is substantially less than the minimum at which any significant ultrafiltration occurs with said membrane.

7. The combination of claim 6 further including means for supporting said assembly with the longitudinal axis of said membrane tube oriented in a generally horizontal direction.

8. In a method for effecting membrane separation using an apparatus for osmosis, dialysis, and electrodialysis including a tube of thin, flexible, semipermeable membrane and reinforcing means, made of soft, supple material and provided with interstices, encircling said membrane tube to restrain said membrane tube against rupture, the step of subjecting fluid located in said membrane tube for participating in said separation to fluid pressure to produce a transmembrane pressure difference substantailly less than the minimum at which any significant ultrafiltration occurs with said membrane but sufficient to bulge said membrane generally radially outward into the interstices of said reinforcing means to a distance equal to at least the radial thickness of the elements of said material bounding said interstices and to generally straighten and stiffen said membrane tube.

9. Membrane separation apparatus for separating from one another components of different molecular weights carried by fluids, said apparatus comprising a series of sequentially adjoining chambers, through each of which fluid can flow, each chamber being separated from each adjoining chamber by a semipermeable membrane, reinforcing means made of supple, soft material and provided with interstices engaging said membrane to restrain said membrane against rupture when said membrane is subjected to transmembrane pressure substantially less than the minimum at which any significant ultrafiltration occurs with said membrane but sufficient to bulge said membrane into said interstices to a distance equal to at least the thickness of the elements of said material bounding the interstices, said membrane forming a barrier common to the two adjoining chambers which can be contacted on one of its surfaces by fluid in one of the two adjoining chambers and can be contacted on the other of its surfaces by fluid in the other of said two adjoining chambers, any two membrane barrier that serve as two separate boundaries for the same chamber constituting a pair of adjacent membrane barriers, and each membrane barrier of at least one pair of adjacent membrane barriers having a molecular weight cutoff value different from that of the other membrane barrier of said pair.

10. Apparatus according to claim 9 adapted for electrodialysis wherein the semipermeable membranes are tubular.

* * * * *

UNITED STATES PATENT AND TRADEMARK OFFICE
CERTIFICATE OF CORRECTION

PATENT NO. : 4,787,982

DATED : November 29, 1988

INVENTOR(S) : Caro et al.

It is certified that error appears in the above-identified patent and that said Letters Patent is hereby corrected as shown below:

Title page, on the line below "OTHER PUBLICATIONS", delete "Pursun" and insert --Dorson--.

Column 6, line 2, delete "for" and insert --to--.

Column 6, line 5, delete "tublar" and insert --tubular--; same line, delete "the".

Column 7, line 62, delete "provie" and insert --provide--.

Column 9, line 37, delete "supened" and insert --suspended--.

Column 12, line 9, delete "substantailly" and insert --substantially--.

line 40, delete "barrier" and insert --barriers--.

Signed and Sealed this

Eighteenth Day of April, 1989

Attest:

DONALD J. QUIGG

*Attesting Officer*

*Commissioner of Patents and Trademarks*